(12) United States Patent
Munson

(10) Patent No.: US 7,096,499 B2
(45) Date of Patent: *Aug. 22, 2006

(54) METHOD AND SYSTEM FOR SIMPLIFYING THE STRUCTURE OF DYNAMIC EXECUTION PROFILES

(75) Inventor: John C. Munson, Moscow, ID (US)

(73) Assignee: Cylant, Inc., Lexington, MA (US)

(*) Notice: Subject to any disclaimer, the term of this patent is extended or adjusted under 35 U.S.C. 154(b) by 801 days.

This patent is subject to a terminal disclaimer.

(21) Appl. No.: 10/099,752

(22) Filed: Mar. 15, 2002

(65) Prior Publication Data

US 2002/0138753 A1 Sep. 26, 2002

Related U.S. Application Data

(63) Continuation-in-part of application No. 09/309,755, filed on May 11, 1999, now Pat. No. 6,681,331.

(51) Int. Cl.
*G06F 11/30* (2006.01)
*G06F 15/16* (2006.01)

(52) U.S. Cl. ...................................................... 726/23

(58) Field of Classification Search ...................... None
See application file for complete search history.

(56) References Cited

U.S. PATENT DOCUMENTS

| | | | |
|---|---|---|---|
| 5,067,073 A | 11/1991 | Andrews | 395/375 |
| 5,278,901 A | 1/1994 | Shieh et al. | 380/4 |
| 5,313,616 A | 5/1994 | Cline et al. | 395/500 |
| 5,355,487 A | 10/1994 | Keller et al. | 395/650 |
| 5,487,131 A | 1/1996 | Kassatly et al. | 395/62 |
| 5,499,340 A | 3/1996 | Barritz | 395/184.01 |

(Continued)

OTHER PUBLICATIONS

Anderson, D. et al., "Next-generation intrusion detection expert system (NIDES)," Technical Report, Computer Science Laboratory, SRI International, Menlo Park, CA, SRI-CSL-95-07, May, 1995, 1-37 (plus 6 additional pages).

(Continued)

*Primary Examiner*—Christopher Revak
(74) *Attorney, Agent, or Firm*—David H. Judson

(57) ABSTRACT

A real-time approach to detecting aberrant modes of system behavior induced by abnormal and unauthorized system activities indicative of abnormal activity of a software system is based on behavioral information obtained from a suitably instrumented computer program as it is executing. The theoretical foundation is founded on a study of the internal behavior of the software system. As a software system is executing, it expresses a set of its many functionalities as sequential events. Each of these functionalities has a characteristic set of modules that is executed to implement the functionality. These module sets execute with defined and measurable execution profiles among the program modules and within the execution paths of the individual modules, which change as the executed functionalities change. Over time, the normal behavior of the system will be defined by the boundary of the profiles. Abnormal activity of the system will result in behavior that is outside the normal activity of the system and thus result in a perturbation of the system in a manner outside the scope of the normal profiles. Such anomalies are detected by analysis and comparison of the profiles generated from an instrumented software system against a set of nominal execution profiles. Moreover, a method for reducing the amount of information necessary to understand the functional characteristics of an executing software system identifies the common sources of variation among the program instrumentation point frequencies and builds execution profiles based on a reduced set of virtual execution domains.

79 Claims, 4 Drawing Sheets

U.S. PATENT DOCUMENTS

| | | | |
|---|---|---|---|
| 5,528,753 A | 6/1996 | Fortin | 395/183.11 |
| 5,539,907 A | 7/1996 | Srivastava et al. | 395/700 |
| 5,557,742 A | 9/1996 | Smaha et al. | 395/186 |
| 5,581,482 A | 12/1996 | Wiedenman et al. | 364/551.01 |
| 5,621,889 A | 4/1997 | Lermuzeaux et al. | 395/186 |
| 5,732,273 A | 3/1998 | Srivastava et al. | 395/704 |
| 5,790,858 A | 8/1998 | Vogel | 395/704 |
| 5,987,250 A | 11/1999 | Subrahmanyam | 395/704 |
| 6,009,514 A | 12/1999 | Henzinger et al. | 712/236 |
| 6,026,236 A | 2/2000 | Fortin et al. | 395/704 |
| 6,094,530 A | 7/2000 | Brandewie | 395/704 |
| 6,266,408 B1 | 5/2001 | Sirosh | 382/224 |
| 6,282,701 B1 | 8/2001 | Wygodny et al. | 717/4 |

OTHER PUBLICATIONS

Anderson, D. et al., "Detecting Unusual Program Behavior Using the Statistical Component of the Next-generation Intrusion Detection Expert System (NIDES)," SRI-CSL-95-06, SRI International, Menlo Park, CA, May, 1995, 1-71, 73-75, 77 (plus 6 additional pages).

Aslam, T. et al., "Use of A Taxonomy of Security Faults," Technical Report TR-96-051, COAST Lab., Purdue University, presented at 19th National Information Systems Security Conference, Sep. 1996, 1-10.

Ball, T. et al., "Optimally Profiling and Tracing Programs," Technical Report #1031, University of Wisconsin, Computer Science Dep., Sep. 1991, 1-27.

Bishop, M., "A Standard Audit Log Format," *Proc. of the 18th National Information Systems Security Conference*, 1995, 136-145.

Bishop, M., "Profiling Under UNIX by Patching," *Software-Practice and Exp.*, Oct. 1987, 17(10), 729-739.

Crosbie, M. et al., "Defending a Computer System using Autonomous Agents," Technical Report No. 95-022, COAST Laboratory, Dept. of Computer Sciences, Purdue University, Mar. 1994, 1-11.

Denning, D., "An Intrusion-Detection Model," *IEEE Transactions on Software Engineering*, Feb. 1987, 13(2), 222-232.

Elbaum, S. et al., "Intrusion Detection through Dynamic Software Measurement," *Proc. Usenix Workshop on Intrusion Detection and Network Monitoring*, Santa Clara, California, Apr. 9-12, 1999, 1-10.

Graham, S.L. et al., "An Execution Profiler for Modular Programs," *Software-Practice and Exp.*, 1983, 13, 671-685.

Hall, R.J., "Call Path Profiling," *Proc. 14th Int'l ; Conf. Soft. Engineering*, ACM, 1992, 296-306.

Halme, L. et al., "AINT misbehaving—a Taxonomy of Anti-intrusion Techniques," *Proc. of the 18th National Information Systems Security Conference*, 1995, 13 pages.

Hochberg, J. et al., "NADIR: An Automated System for Detecting Network Intrusion and Misuse," *Computers & Security*, 1993, 12(3), 235-248.

Ilgun, K., "USTAT: A Real-time Intrusion Detection System for UNIX," *Proc. of the IEEE Symposium on Research in Security and Privacy*, May 24-26, 1993, 16-28.

Javitz, H. et al., "The SRI IDES Statistical Anomaly Detector," *Proc. of the IEEE Symposium on Research in Security and Privacy*, May 20-22, 1991, 316-326.

Johnson, "Profiling for Fun and Profit," *UNSENIX Winter '90 Conference Proceedings*, 1990, 325-330.

Jonsson, E. et al. "A Quantitative Model of the Security Intrusion Process Based on Attacker Behavior," *IEEE Transactions on Software Engineering*, Apr. 1997, 23(4), 235-245.

Kumar, S. et al., "A Pattern Matching Model for Misuse Intrusion Detection," *Proc. of the 17th National Computer Security Conference*, COAST Laboratory, Dept. of Computer Sciences, Purdue University, Oct. 1994, 11-21.

Kumar, S. et al., "A Software Architecture to Support Misuse Intrusion Detection," *Proc. 18th National Information Systems Security Conference*, COAST Laboratory, Dept. of Computer Sciences, Purdue University, Mar. 1995, 1-17.

Lankewicz, L. et al., "Real-Time Anomaly Detection Using a Nonparametric Pattern Recognition Approach," Seventh Annual Computer Security Applications Conference, San Antonio, Texas, Dec. 2-6, 1991, 80-89.

Larus, J.R., "Abstract Execution: A Technique for Efficiently Tracing Programs," *Software-Practice and Experience*, Dec. 1990, 20(12), 1241-1258.

Larus, J.R. et al., "Rewriting Executable Files to Measure Program Behavior," Technical Report #1083, University of Wisconsin, Computer Science Dep., Mar. 25, 1992, 1-17.

Lunt, T., "A Survey of Intrusion Detection Techniques," *Computers & Security*, 1993, 12, 405-418.

Mukherjee, B. et al., "Network Intrusion Detection," *IEEE Network*, May/Jun. 1994, 8(3), 26-41.

Munson, J., "A Functional Approach to Software Reliability Modeling," In *Quality of Numerical Software, Assessment and Enhancement*, Boisvert (ed.), Chapman & Hall, London, 1997, 61-76.

Petersen, K., "IDA—Intrusion Detection Alert," *Proc. of the IEEE Annual International Computer Software and Applications Conference*, Chicago, IL, Sep. 21-25, 1992, 306-311.

Porras, P. et al., "Penetration State Transition Analysis—A Rule-Based Intrusion Detection Approach," *Eighth Annual Computer Security Applications Conference*, IEEE Computer Society Press, Nov. 30-Dec. 4, 1992, 220-229.

Power, L.R., "Design and use of a program execution analyzer," *IBM Systems J.*, 1983, 22(3), 271-294.

Puketza, N. et al., "A Methodology for Testing Intrusion Detection Systems," *IEEE Transactions on Software Engineering*, Oct. 1996, 22(10), 719-729.

Shieh et al., "A Pattern-Oriented Intrusion-Dectection Model and Its Applications," *Proc. of the 1991 IEEE Symposium on Research in Security and Privacy*, Oakland, Calif., May 20-22, 1991, 327-342.

Smaha, S., "Haystack: An Intrusion Detection System," *Proceedings of the Fourth Aerospace Computer Security Applications Conference*, Orlando, Florida, IEEE Computer Society, Dec. 12-16, 1988, 37-44.

Smith, M.D., "Tracing with Pixie," Stanford University Technical Report No. CSL-TR-91-497, Apr. 4, 1991, 1-29.

Sobirey, M. et al., "The Intrusion Detection System AID. Architecture, and Experiences in Automated Audit Analysis," *Proc. of the International Conference on Communications and Multimedia Security*, Sep. 23-24, 1996, 278-290.

Speer, S.E., "Improving UNIX Kernel Performance Using Profile Based Optimization," Winder USENIX, Jan. 17-21, 1994, 181-188.

Teng, H. et al., "Adaptive Real-time Anomaly Detection Using Inductively Generated Sequential Patterns," *Proc. of the IEEE Symposium on Research in Security and Privacy*, Oakland, CA, May 7-9, 1990, 278-284.

Vaccaro, H. et al., "Detection of Anomalous Computer Session Activity," *Proc. of the IEEE Symposium on Research in Security and Privacy*, Oakland, CA, May 1-3, 1989, 280-289.

Wall, D.W., "Global Register Allocation at Link Time," Digital Equipment Corporation, WRL Research Report 86/3, Oct. 1986 1-20.

Dasgupta, D. et al., "Novelty Detection in Time Series Data Using Ideas from Immunology," 1995, 6 pages.

D'haeseleer, P. et al., "A Distributed Approach to Anomaly Detection," Aug. 30, 1997, 30 pages.

D'haeseleer, P. et al., "An Immunology Approach to Change Detection: Algorithms, Analysis and Implications," *IEEE Symposium on Security and Privacy*, 1996, 10 pages.

Forrest, S. et al., "Computer Immunology," *Comm. of the ACM*, Mar. 21, 1996, 18 pages.

Forrest, S. et al., "Self-Nonself Discrimination in a Computer," *Proceedings of IEEE Symposium on Research in Security and Privacy*, 1994, 11 pages.

Hofmeyr, S.A., "Intrusion Detection Using Sequences of System Calls," Dec. 17, 1997, 41 pages.

Hofmeyr, S.A. et al., "Architecture for an Artificial Immune System," 2000, 31 pages.

Somayaji, A. et al., "Automated Response Using System-Call Delays," *Proceedings of the 9th USENIX Security Simposium*, Aug. 14-17, 2000, 13 pages.

Somayaji, A. et al., "Principles of a Computer Immune System," *ACM, New Security Paradigms Workshop*, Langdale, Cumbria UK, 1998, 75-82.

Warrender, C. et al., "Detecting Intrusions Using System Calls: Alternative Data Models," *IEEE Computer Society, Symposium on Security and Privacy*, 1999, 133-145.

METHOD AND SYSTEM FOR SIMPLIFYING THE STRUCTURE OF DYNAMIC EXECUTION PROFILES

CROSS REFERENCE TO RELATED APPLICATIONS

The present application is a continuation-in-part of U.S. patent application Ser. No. 09/309,755, filed May 11, 1999, now U.S. Pat. No. 6,681,331, titled "Dynamic Software System Intrusion Detection," which is hereby incorporated by reference in its entirety.

FIELD OF THE INVENTION

The present invention generally relates to systems for dynamically detecting intrusive or otherwise anomalous use of computer software, and more particularly to software profiling techniques for analyzing the behavior of a computer program or system.

BACKGROUND OF THE INVENTION

The present invention is particularly suited for, but by no means limited to, application in the field of computer system security. The background of the invention will therefore be described in the context of computer system security.

The literature and media abound with reports of successful violations of computer system security by both external attackers and internal users. These breaches occur through physical attacks, social engineering attacks, and attacks on the system software. In a system software attack, the intruder subverts or bypasses the security mechanisms of the system in order to gain unauthorized access to the system or to increase current access privileges. These attacks are successful when the attacker is able to cause the system software to execute in a manner that is typically inconsistent with the software specification and thus leads to a breach in security.

Intrusion detection systems monitor some traces of user activity to determine if an intrusion has occurred. The traces of activity c an be collated from audit trails or logs, network monitoring or a combination of both. Once the data regarding a relevant aspect of the behavior of the system are collected, the classification stage starts. Intrusion detection classification techniques can be broadly catalogued in the two main groups: misuse intrusion detection, and anomaly intrusion detection. The first type of classification technique searches for occurrences of known attacks with a particular "signature," and the second type searches for a departure from normality. Some of the newest intrusion detection tools incorporate both approaches.

One known system for detecting an intrusion is the EMERALD™ program. EMERALD defines the architecture of independent monitors that are distributed about a network to detect intrusions. Each monitor performs a signature or profile analysis of a "target event stream" to detect intrusions and communicates such detection to other monitors on the system. The analysis is performed on event logs, but the structure of the logs is not prescribed and the timeliness of the analysis and detection of an intrusion depends on the analyzed system and how it chooses to provide such log data. By monitoring these logs, EMERALD can thus determine that at some point in the event stream recorded in the log, an intrusion occurred. However, the detection is generally not implemented in real time, but instead occurs at some interval of time after the intrusion. Also, this system does not allow monitoring of all types of software activity, since it is limited to operating system kernel events. It would be desirable to provide a real time intrusion detection paradigm that is applicable to monitoring almost any type of program.

A more general case of the intrusion detection problem is the problem of anomalous behavior detection. It is possible to detect anomalous behavior based on the measurement of program activity as control is passed among program control structures. As a system executes its customary activities, the behavior monitoring scheme should estimate a nominal system behavior. Departures from the nominal system profile will likely represent potential anomalous activity on the system. Since unwanted activity may be detected by comparison of the current system activity to that occurring during previous assaults on the system, it would be desirable to store profiles for recognizing these activities from historical data. Historical data, however, cannot be used to recognize new kinds of behavior. An effective security tool would be one designed to recognize assaults as they occur through the understanding and comparison of the current behavior against nominal system activity. The subject matter disclosed herein and in U.S. patent application Ser. No. 09/309,755, now U.S. Pat. No. 6,681,331, addresses these issues.

A modern software system is composed of a plurality of subcomponents called modules. Each program module generally implements a specific functional requirement. As the program executes, each module may call another module. Through a specific sequence of calls from one module to another, a higher level of functional granularity is achieved. Many times there is a very tight binding between the sequences of calls to program modules. That is, one module may always call another module. If this is the case, there is a high correlation between the activities of the two modules. They are bound so closely together that they interact as one functional unit. One goal of the present invention is to provide improved profiling techniques for use in analyzing interactions between and among program modules to identify anomalous behavior, e.g., in the field of computer security.

At a finer level of granularity, each program module has internal structure as represented by a flowgraph. There are many potential execution paths through each program module. By instrumenting the paths associated with the decision points within each module, not only can the observation of the interaction of program modules be made but the interactions within the program modules may be observed as well.

SUMMARY OF THE INVENTION

The present invention provides improvements in software profiling techniques for understanding and analyzing the behavior of a computer program. The invention provides a statistical methodology to identify a small working set of cohesive program instrumentation points that represent the dynamic bindings in the program structure as it executes. More specifically, the present invention provides a way to reduce the dimensionality of the dynamic software profiling problem space, i.e., to identify distinct sources of variation in the interaction of program modules and to reduce the number of actual observations necessary to characterize the behavior of an executing software system. Other aspects of the present invention are described below.

BRIEF DESCRIPTION OF THE DRAWINGS

The foregoing aspects and many of the attendant advantages of the present invention will become more readily appreciated as the same becomes better understood by reference to the following detailed description, when taken in conjunction with the accompanying drawings, wherein.

DETAILED DESCRIPTION OF PREFERRED EMBODIMENTS

Overview

Figure 1:
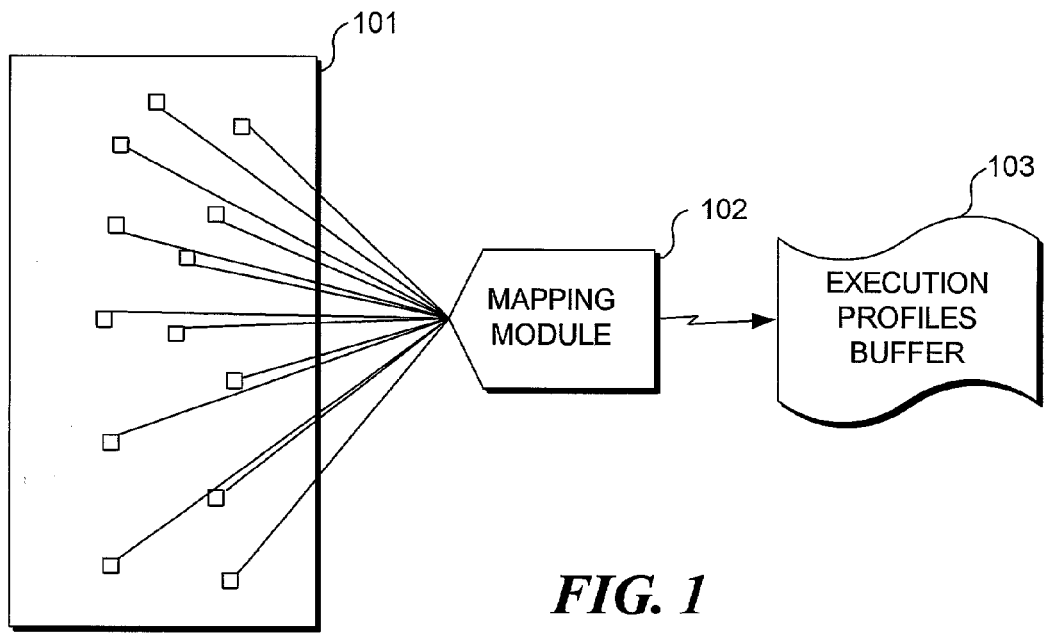
FIG. 1 is a block diagram illustrating the operation of a mapping module with code instrumentation points.

A system in accordance with the present invention employs dynamic software measurement to assist in the detection of intruders. Dynamic software measurement provides a framework to analyze the internal behavior of a system as it executes and makes transitions among its various control structures governed by the structure of a program flowgraph. A target system is instrumented so that measurements can be obtained to profile the execution activity on the system in real time. Essentially, this approach measures from the inside of a software system to make inferences as to what is occurring outside of the program environment.

Program modules are distinctly associated with certain functionalities that a program is capable of performing. As each function is executed, it creates its own distinct signature of activity. Since the nominal behavior of a system is more completely understood while it is executing its customary activities, this nominal system behavior can be profiled quite accurately. Departures from a nominal system profile represent potential anomalous activity on the system. The system disclosed herein is designed to recognize abnormal activity as it occurs through the understanding and comparison of the current behavior against nominal system activity.

Moreover, the present invention provides a method and system for reducing the amount of information necessary to understand the functional characteristics of an executing software system. The invention permits one to identify common sources of variation among program modules and to build execution profiles based on a reduced set of virtual execution domains.

Illustrative embodiments of a system operating in accordance with the present invention include two modes of operation, although the present invention is by no means limited thereto. Each of these exemplary modes represents an incremental improvement in the ability of the system to detect an anomalous activity of the system or program executing thereon. However, as the resolving ability of the system increases, there can be an associated penalty in processing overhead.

1. In a first mode, simple execution profiles indicative of modules that have executed are employed for the evaluation of anomalous activity. For example, an execution profile may be created by maintaining a module sequence buffer including a list of all modules that have executed in a given time frame and the frequencies of their executions. In one presently preferred implementation of this mode, a profile transducer accumulates the module frequencies until the number of module transitions that have occurred during the sampling interval reaches a given value. This mode is the most coarse-grained level of operation for the detection of anomalous behavior but, of the two modes, it has the least cost in terms of performance.

2. In the second mode, the software is instrumented on all paths from predicate nodes or decision points in each software module for the evaluation of intrusive activity. For example, an execution profile may be created by maintaining an execution path sequence buffer including a list of all decision paths that have executed in a given time frame and the frequencies of their executions. In one presently preferred implementation of this mode, a profile transducer accumulates frequencies until the total number of module transitions that have occurred during the sampling interval reaches a predetermined value.

In addition, the present invention may also be implemented in a mode whereby the amount of profile data used to detect anomalous activity is substantially reduced. A potential problem with using raw execution profiles, or raw execution vectors, is that the volume of data generated by a typical program can be very large, which can generate prohibitively large computational loads on the monitoring system. A methodology presented herein reduces the dimensionality of the problem from a very large set of program instrumentation points representing small execution domains (modules or execution paths) whose activity is highly correlated to a much smaller set of virtual program domains whose activity is substantially uncorrelated. To achieve this reduction in the dimensionality of the problem space, the statistical techniques of principal components analysis or principal factor analysis may be employed, although the present invention is not limited to these techniques.

Operating Environment

FIG. 1 illustrates the internal program environment of a program that has been suitably instrumented for anomaly and/or intrusion detection. Each program will have a plurality of program instrumentation points. Control is passed to a mapping module 102 that records activity at that instrumentation point. The mapping module transmits the telemetry information to an execution profile buffer 103 that buffers these data until they are requested from the external program environment. All of structures 101–103 are preferably encapsulated within the operating environment of a program to which the present invention is applied to detect anomalous behavior.

Figure 2:
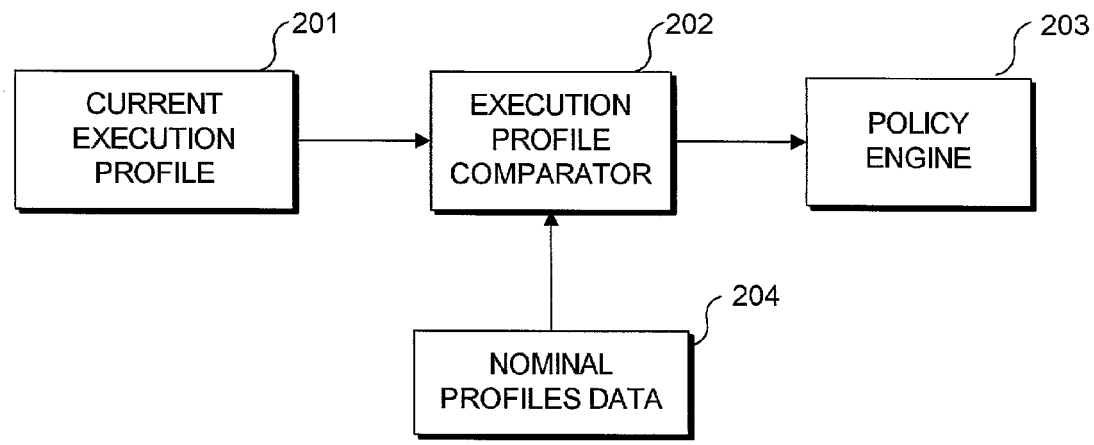
FIG. 2 is a block diagram illustrating the operation of a execution profile comparator.

FIG. 2 shows the operation of an execution profile comparator 202. The execution profile comparator determines any difference (i.e., a differenced profile) between a current execution profile 201 most recently obtained from first profile transducer 202 and a nominal execution profile obtained from nominal profiles data 204, which represents the steady-state behavior of the software system with no abnormal activity. The nominal profiles data are initially established by a calibration process that is implemented by running the program in a calibration mode in which the program is run through as many of the functions and operations performed during a nominal operational phase. A nominal activity profile and boundary conditions for variations during this nominal operational phase are accumulated during this calibration mode. The nominal profile is subsequently modified by a user (or administrator), if during normal operation of the program an alarm is raised, but it is determined that no abnormal activity has occurred. In a typical software application, there may be a wide range of behavior that is considered nominal. The computational result of the comparison between the current execution profile and the steady state behavior of the system represented by the nominal profile suite is used in two different subsystems. The current profile is analyzed against the nominal profiles data 204 and a difference value is constructed by the execution profile comparator 202. This difference value is transmitted to the policy engine 203 to determine what action will take place based on a preset policy.

Figure 3:
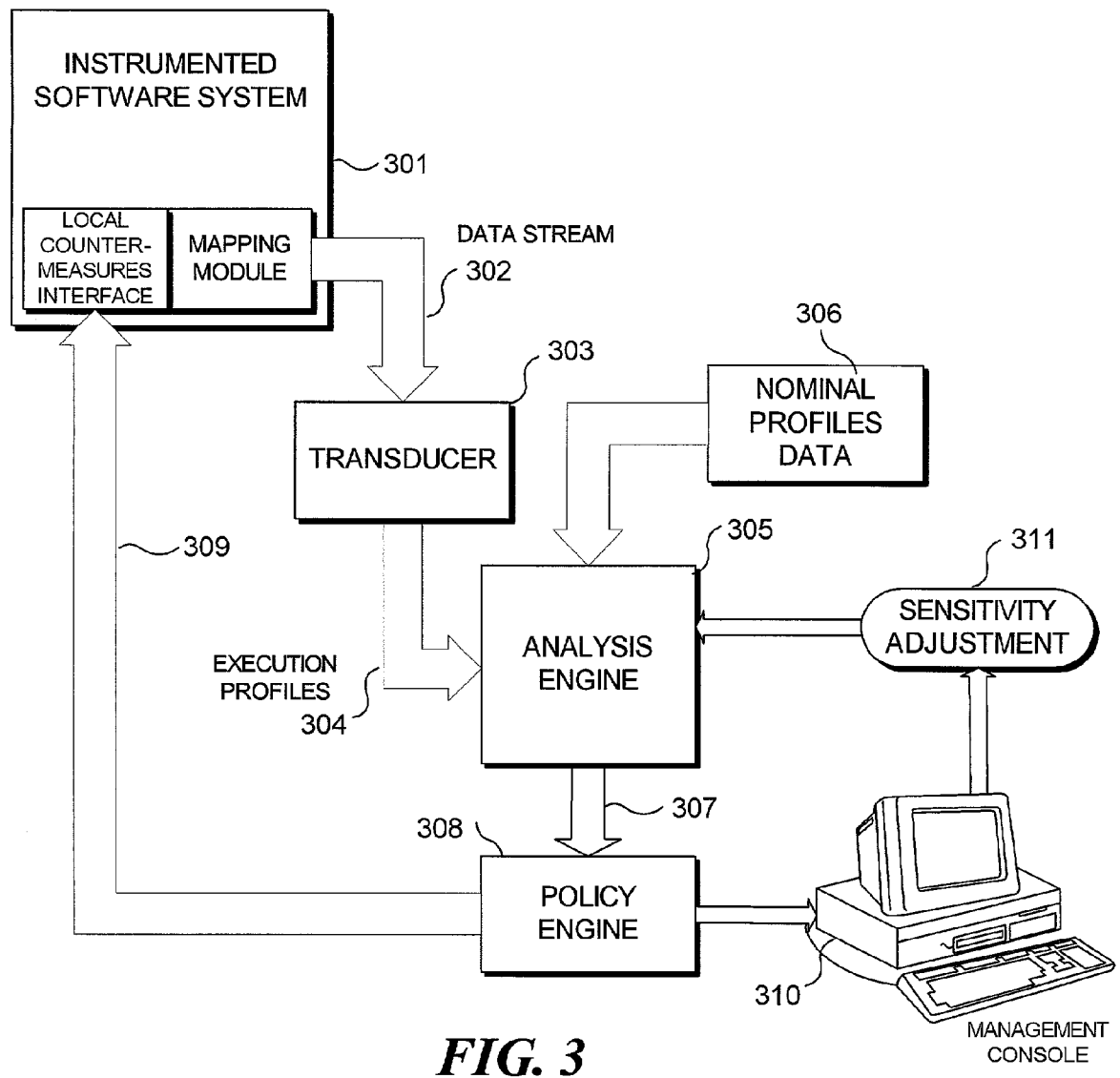
FIG. 3 is a block diagram illustrating an environment in which a preferred embodiment of the present invention operates.

FIG. 3 shows the relationship among the various components of an anomaly detection system. A transducer 303 and an analysis engine 305 are important functional components of the anomaly detection methodology. The transducer obtains signals from an instrumented software system 301 and computes activity measures for these signals. The actual software signals may be obtained either from instrumented code (software probes) or directly from a hardware address bus (a hardware probe). The inputs to the transducer are software module entry and exit events that may be obtained either from software or hardware instrumentation.

The transducer will produce from the module probes, a summary profile of the module execution frequencies. The transducer preferably interacts with the software system in real-time. That is, all transition events are preferably available to the transducer as they occur.

The output of transducer 303 is sent directly to analysis engine 305 for analysis. All sampling activity is measured in system epochs, or instrumentation transitions.

Each execution profile 304 is obtained from transducer 303 by analysis engine 305. The comparator makes a formal assessment as to whether the current system activity is nominal or otherwise. There are essentially two types of non-nominal activity. The first occurs as new users or new programs are being run on the system. This new activity is reviewed by an external decision maker, such as the system administrator, and if determined to be non-threatening by that person, is added to the system repertoire of nominal behavior in a nominal profiles database 306. However, the observed activity may represent anomalous activity.

The ability to recognize an anomalous event is dependent on the variance in the profiles of software activity. An incoming execution profile 304 is compared against calibration data for nominal system activity by the analysis engine. A difference value is created between this execution profile and the nominal behavior. This difference value 307 is sent to the policy engine 308. The policy engine compares the difference value against a predetermined threshold set by a system administrator at the system console 310. If the difference value is outside of a predetermined range the policy engine will transmit a signal 309 to the countermeasures interface in the instrumented software system to take action against the anomalous behavior.

To enhance the overall viability of the system to detect new and unobserved anomalous events, a management console 310 may optionally be added to the system. This management receives a data stream from the policy engine and graphically displays execution profile information (distances of departure from normality) in a continuous recording strip on a display terminal (not separately shown). The moving image of system activity is shown graphically by an emerging sequence of distances along the X-axis of the display. Module (or functionality) frequency data are displayed to render a visual image of overall system activity. The management console provides a real-time image of system activity from which a system administrator. The management console also provides a convenient mechanism for the system user to interrogate and receive information about specific system activity and set security policy. This security policy is implemented by adjusting the sensitivity of the system 312 by changing the thresholds for recognition of anomalous behavior. By clicking on any of the distances the user will receive information as to the program activity associated with each distance measure.

The Profile-Oriented Anomaly Detection Model

As any software system is being specified, designed and developed, it is constructed to perform a distinct set of mutually exclusive operations O for the customer. An example of such an operation might be the activity of adding a new user to a computer system. At the software level, these operations may be reduced to a well-defined set of functions F. These functions represent the decomposition of operations into sub-problems that may be implemented on computer systems. The operation of adding a new user to the system might involve the functional activities of changing from the current directory to a password file, updating the password file, establishing user authorizations, and creating a new file for the new user. During the software design process, the basic functions are mapped by system designers to specific software program modules that implement the functionality.

From the standpoint of computer security, not all operations are equal. Some user operations may have little or no impact on computer security considerations. Other operations, such as system maintenance activities, have a much greater impact on security. System maintenance activities being performed by system administrators would be considered nominal system behavior. System maintenance activities being performed by dial-up users, on the other hand, would not be considered nominal system behavior. In order to implement this decomposition process, a formal description of these relationships must be established. To assist in the subsequent discussion of program functionality, it will be useful to make this description somewhat more precise by introducing some notation conveniences.

Formal Description of Software Operation

Assume that a software system S was designed to implement a specific set of mutually exclusive functionalities F. Thus, if the system is executing a function $f \in F$, then it is not expressing elements of any other functionality in F. Each of these functions in F was designed to implement a set of software specifications based on a user's requirements. From a user's perspective, this software system will implement a specific set of operations O. This mapping from the set of user perceived operations O to a set of specific program functionalities is one of the major functions in the software specification process. It is possible, then, to define a relation IMPLEMENTS over O×F such that IMPLEMENTS(o,f) is true if functionality f is used in the specification of an operation o.

From a computer security standpoint, operations can be envisioned as the set of services available to a user (e.g., login, open a file, write to a device), and functionalities as the set of internal operations that implement a particular operation (e.g., user-id validation, access control list (ACL) lookup, labeling). When viewed from this perspective, it is apparent that user operations, which may appear to be non-security relevant, may actually be implemented with security relevant functionalities (send mail is a classic example of this, an inoffensive operation of send mail can be transformed into an attack, if the functionalities that deal with buffers are thereby overloaded).

The software design process is strictly a matter of assigning functionalities in F to specific program modules m∈M, the set of program modules of system S. The design process may be thought of as the process of defining a set of relations ASSIGNS over F×M, such that ASSIGNS(f, m) is true if functionality f is expressed in module m. For a given software system S, let M denote the set of all program modules for that system. For each function f∈F, there is a relation p over F×M such that p(f,m) is the proportion of execution events of module m when the system is executing function f.

Each operation that a system may perform for a user may be thought of as having been implemented in a set of functional specifications. There may be a one-to-one mapping between the user's notion of an operation and a program function. In most cases, however, there may be several discrete functions that must be executed to express the user's concept of an operation. For each operation o that the system may perform, the range of functionalities f must be well known. Within each operation, one or more of the system's functionalities will be expressed.

A finer level of measurement granularity may be achieved by instrumenting each decision path within each program module. In this case, each branch on a decision path from a predicate node will be monitored with suitable instrumentation.

The Software Epoch

When a program is executing a functionality, it apportions its activities among a set of modules. As such, it transitions from one module to the next on a call (or return) sequence. Each module called in this call sequence will have an associated call frequency. When the software is subjected to a series of unique and distinct functional expressions, there is a different behavior for each of the user's operations, in that each will implement a different set of functions, which, in turn, invoke possibly different sets of program modules.

An epoch begins with the encounter of an instrumentation point in the code. The current epoch ends when a new instrumentation point is encountered. Each encounter with an execution point represents an incremental change in the epoch number. Computer programs executing in their normal mode make state transitions between epochs rather rapidly. In terms of real clock time, many epochs may elapse in a relatively short period.

Formal Definitions of Profiles

It can be seen that there is a distinct relationship between any given operation o and a given set of program modules. That is, if the user performs a particular operation, then this operation manifests itself in certain modules receiving control. It is also possible to detect, inversely, which program operations are being executed by observing the pattern of modules executing, i.e., the module profile. In a sense, the mapping of operations to modules and the mapping of modules to operations is reflexive.

When the process of software requirements specification is complete, a system consisting of a set of mutually exclusive operations will have been defined. Characteristically, each user of a new system will cause each operation to be performed at a potentially different rate than another user. Each user, then, will induce a probability distribution on the set O of mutually exclusive operations. This probability function is a multinomial distribution and constitutes the operational profile for that user.

The operational profile of a software system is the set of unconditional probabilities of each of the operations in O being executed by the user. Then, $Pr[X=k]$, $k=1,2,\ldots,\|O\|$ is the probability that the user is executing program operation k as specified in the functional requirements of the program and $\|O\|$ is the cardinality of the set of operations. A program executing on a serial machine can only be executing one operation at a time. The distribution of the operational profile is thus multinomial for programs designed to fulfill more than two distinct operations.

A user performing the various operations on a system causes each operation to occur in a series of steps or transitions. The transition from one operation to another may be described as a stochastic process. In this case, an indexed collection of random variables $\{X_t\}$ may be defined, where the index t runs through a set of non-negative integers $t=0, 1, 2, \ldots$ representing the individual transitions or intervals of the process. At any particular interval, the user is found to be expressing exactly one of the system's a operations. The fact of the execution occurring in a particular operation is a state of the user. During any interval, the user is found performing exactly one of a finite number of mutually exclusive and exhaustive states that may be labeled 0, 1, 2, . . . a. In this representation of the system, there is a stochastic process $\{X_t\}$, where the random variables are observed a intervals $t=1, 2, \ldots$ and where each random variable may take on any one of the (a+1) integers, from the state space $O=\{0, 1, 2, \ldots, a\}$.

Each user may potentially bring his/her own distinct behavior to the system. Thus, each user will have a unique characteristic operational profile. It is a characteristic, then, of each user to induce a probability function $p_i=Pr[X=i]$ on the set of operations O. In that these operations are mutually exclusive, the induced probability function is a multinomial distribution.

As a software system is specified designed, the user requirements specifications, the set O must be mapped on a specific set of functionalities F by systems designers. The set F represents the design specifications for the system. As per the earlier discussion, each operation is implemented by one or more functionalities. The transition from one functionality to another may be also described as a stochastic process. Thus, a new indexed collection of random variables $\{Y_t\}$ may be defined, representing the individual transitions events among particular functionalities. At any particular interval, a given operation expresses exactly one of the system's b+1 functionalities. During any interval, the user is found performing exactly one of a finite number of mutually exclusive and exhaustive states that may be labeled 0, 1, 2, ..., b. In this representation of the system, there is a stochastic process $\{Y_t\}$, where the random variables are observed at intervals t=0, 1, 2, ... and where each random variable may take on any one of the (b+1) integers, from the state space F={0, 1, 2, ..., b}.

When a program is executing a given operation, say $o_k$, it will distribute its activity across the set of functionalities $F^{(o_k)}$. At any arbitrary interval, n, during the expression of $o_k$, the program will be executing a functionality $f_i \in F^{(o_k)}$ with a probability, $Pr[Y_n=i|X=k]$. From this conditional probability distribution for all operations, the functional profile for the design specifications may be derived as a function of a user operational profile, as:

$$Pr[Y=i]=\Sigma_j Pr[X=j]Pr[Y=i|X=j].$$

Alternatively:

$$w_i=\Sigma_j p_j Pr[Y=i|X=j].$$

The next logical step is to study the behavior of a software system at the module level. Each of the functionalities is implemented in one or more program modules. The transition from one module to another may be also described as a stochastic process. Therefore, a third indexed collection of random variables $\{Z_t\}$ may be defined, as before, representing the individual transitions events among the set of program modules. At any particular interval, a given functionality is found to be executing exactly one of the system's c modules. The fact of the execution occurring in a particular module is a state of the system. During any interval, the system is found executing exactly one of a finite number of mutually exclusive and exhaustive states (program modules) that may be labeled 0, 1, 2, ..., c. In this representation of the system, there is a stochastic process $\{Z_t\}$, where the random variables are observed at epochs t=0, 1, 2, ... and where each random variable may take on any one of the (c+1) integers, from the state space M={0, 1, 2, ..., c}.

Each functionality j has a distinct set of modules $M_{f_j}$ that it may cause to execute. At any arbitrary interval n during the expression of $f_j$, the program will be executing a module $m_i \in M_{f_j}$ with a probability $u_{jk}=Pr[X_n=i|Y=k]$. From this condition probability distribution for all functionalities, the module profile for the system may be derived as a function of the system functional profile as follows:

$$Pr[Z=i]=\Sigma_j Pr[Y=j]Pr[Z=i|Y=j].$$

Again, $$r_i=\Sigma_j w_j Pr[Z=i|Y=j].$$

The module profile r ultimately depends on the operational profile p as can be seen by substituting for $w_j$ in the equation above.

$$r_i=\Sigma_j \Sigma_k p_k Pr[Y=j|X=k]Pr[Z=i|Y=j]$$

Each distinct operational scenario creates its own distinct module profile. It is this fact that may be exploited in the detection of unwanted or intrusive events.

In summary, when a user is exercising a system, the software will be driven through a sequence of transitions from one instrumentation point to the next, $S=(m_{ab}, m_{bc}, m_{cd}, ...)$, where $m_{ab}$ represents a transition from instrumentation point a to instrumentation point b. Over a fixed number of epochs, each progressive sequence of n observations will represent a new execution profile. It represents a sample drawn from a pool of nominal system behavior. Thus, the series of sequences $S=(S_i, S_{i+1}, S_{1+2}, ...)$ above will generate a family of execution profiles $(p_i, p_{i+1}, p_{i+2}, ...)$. What becomes clear after a period of observation is that the range of behavior exhibited by a system and expressed in sequences of execution profiles is highly constrained. There are certain standard behaviors that are demonstrated by the system during its normal operation. Abnormal system activities will create significant disturbances in the nominal system behavior.

The whole notion of anomaly detection would be greatly facilitated if the functionalities of the system were known and well defined. It would also be very convenient if there were a precise description of the set of operations for the software. Indeed, if these elements of software behavior were known and precisely specified, the likelihood of vulnerabilities in the system would diminish greatly. In the absence of these specifications, it will be assumed that neither the operational profiles nor the functional profiles can be observed directly. Instead, the distribution of activity among the program modules must be observed in order to make inferences about the behavior of the system.

The presently preferred implementations of the present invention, then, represent a new real-time approach to detect aberrant modes of system behavior induced by abnormal and unauthorized system activities. Within the category of aberrant behavior, there are two distinct types of problems. First, a user may be executing a legitimate system operation (technically an operation $o \in O_E$) for which he is not authorized. Second, a user (hacker) could be exploiting his knowledge of the implicit operations of the system by executing an operation $o \in O_I$. Each of these two different types of activities will create a distinct and observable change in the state of the software system and its nominal activity. Violations in the security of the system will result in behavior that is outside the normal activity of the system and thus result in a perturbation in the normal profiles. These violations are detected by the analysis of the profiles generated from an instrumented software system against a database of established normal behavior.

It is important to note that the present invention is broadly applicable to almost any type of software and can monitor activity occurring in any application or operating system to detect anomalies indicative of intrusive behavior. Prior art intrusion detection systems generally monitor events from the outside in and thus, can overlook an intrusion because they do not respond to variations in software internal activity that is not logged. In contrast, a system in accordance with the present invention can operate in real time, from within the application being monitored, and is able to respond to subtle changes that occur as a result of anomalous system behavior. Furthermore, since the inventive system can be applied to any type of computational activity, it can be used to monitor almost any type of software system and detect intrusions, for example, in software running a web server, or in database management systems, or operating system shells, or file management systems. Any software that may impacted by deliberate misuse may be instrumented and monitored to detect such misuse or intrusion.

The Flowgraph Representation of a Program

The internal structure of a program module can also be instrumented to enhance the detectability of anomalous program activity. The internal structure of a program module will be modeled in terms of its control flowgraph. A control flowgraph of a program module is constructed from a directed graph representation of the program module that can be defined as follows:

A directed graph, G=(N, E, s, t), consists of a set of nodes, N, a set of edges E, a distinguished node s, the start node and a distinguished node t, the exit node. An edge is an ordered pair of nodes, (a, b).

The in-degree I (a) of node a is the number of entering edges to a.

The out-degree O (a) of node a is the number of exiting edges from a.

The flowgraph representation of a program, F=(E',N', s, t), is a directed graph that satisfies the following properties.

There is a unique start node s such that I(s)=0.

There is a unique exit node t such that O(t)=0.

All other nodes are members of exactly one of the following three categories.

Processing Node: it has one entering edge and one exiting edge. They represent processing node a, I (a)=1 and O (a)=1.

Predicate Node: represents a decision point in the program as a result of if statements, case statements or any other statement that will cause an alteration in the control flow. For a predicate node a, I (a)=1 and O (a)>1.

Receiving Node: it represents a point in the program where two or more control flows join, for example, at the end of a while loop. For a receiving node a, I(a)>1 and O(a)=1.

If (a, b) is an edge from node a to node b, the n node a is an immediate predecessor of node b and node b is an immediate successor of node a. The set of all immediate predecessors for node a is denoted as IP (a). The set of all immediate successors for node b is denoted as IS (b). No node may have itself as a successor. That is, a may not be a member of IS (a). In addition, no processing node may have a processing node as a successor node. All successor nodes to a processing node must be either predicate nodes or receiving nodes. Similarly, no processing node may have a processing node as its predecessor.

A path P in a flowgraph F is a sequence of edges $<\overrightarrow{a_1 a_2}, \overrightarrow{a_2 a_3}, \ldots, \overrightarrow{a_{n-1} a_n}>$ where all $a_i$ (I=1, ..., N) are elements of N'. P is a path from node $a_1$ to node $a_n$. An execution path in F is any path P from s to t.

Instrumentation Points

As the software executes there are specific points in the execution path that can be monitored either by hardware or software probes. At the highest level of granularity, the structure of the operation of the software system can be analyzed through instrumentation placed at the beginning of each program module. The next level of instrumentation would also insert instrumentation points prior to the return from each program module.

The lowest level of granularity of instrumentation is achieved by inserting instrumentation points at selected points in a program module based on its flowgraph representation. At this level, probes are inserted at every edge exiting a predicate node. That is, if any node, a, in the flowgraph representing the program module has multiple successor nodes, $b_1, b_2, \ldots, b_n$, then probes will be inserted into the edges represented by $ab_1, ab_2, ab_n$.

Simplifying the Dynamic Execution Profiles

Figure 3A:
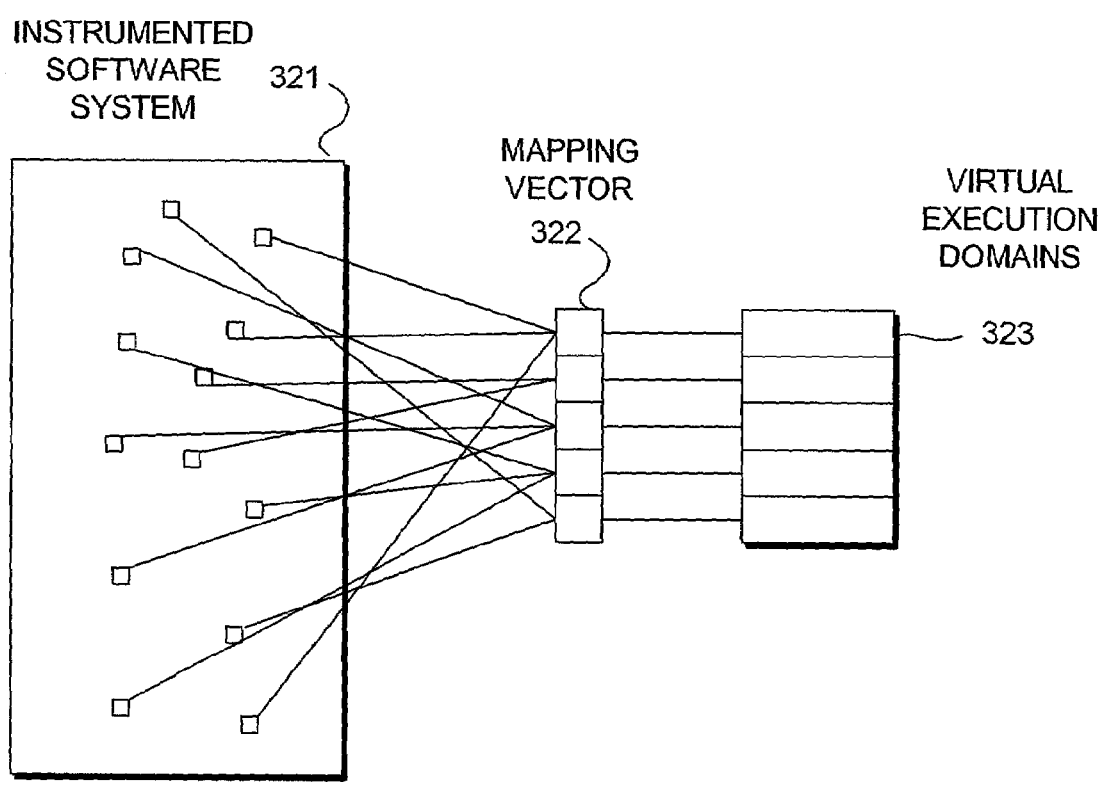
FIG. 3A is a block diagram illustrating a plurality of modules in an instrumented software system. This diagram is used in explaining a methodology in accordance with the present invention to identify distinct sources of variation in the interaction of program modules and to reduce the number of observations necessary to characterize the behavior of an executing software system.

We will now turn to an inventive methodology to reduce the dimensionality of the dynamic software profiling problem space. As discussed above, modern software systems are composed of a plurality of modules in an instrumented software system 321 as shown in FIG. 3A, and each program module generally implements a specific functional requirement. A methodology in accordance with this aspect of the present invention may be utilized to identify distinct sources of variation in the interaction of program modules and substantially reduce the number of actual observations necessary to characterize the behavior of an executing software system. A mapping vector 322 is constructed that will send observations from each software instrumentation point to a single virtual execution domain 323. This will serve to reduce the dimensionality of the problem space at least two orders of magnitude.

As the program executes, each module may call another module. Through a specific sequence of calls from one module to another, a higher level of functional granularity is achieved. Moreover, there may be a very tight binding between the sequences of calls to program modules—that is, one module may always call another module. If this is the case, there is a high correlation between the activities of the two modules. They are bound so closely together that they interact as one functional unit. The present invention provides a statistical methodology to identify a small working set of cohesive program modules that represent the dynamic bindings among program modules as they execute.

As a program executes, it will encounter the instrumentation points that monitor its activity. Each of these encounters will define one epoch in the execution of the program.

In the course of normal program activity, the telemetry from the instrumentation points at each epoch are recorded in an execution profile for the program. This execution profile is an n element vector, X, containing one entry for each program module. Each element, $x_i$, of this vector, X, will contain a frequency count for the number of times that the corresponding instrumentation point $m_i$ has executed during an era of k epochs. Thus, $$k = \sum_{i=1}^{n} x_i.$$

One of the major problems in monitoring the execution behavior of a modern software system is that the value of k will become very large in a very short period on a real time clock reference framework. To be meaningful at all, these data must be captured periodically and recorded for later analysis. In this context, an execution profile might be recorded whenever the value of k reaches a total count of, say, K, at which time the contents of the original execution profile vector would be reset to zero, i.e., $x_i=0$, $\forall i=1,2,\ldots n$. The recorded activity of a program during its last L=jK epochs will be stored in a sequence of j execution profiles, $X_1, X_2, \ldots, X_j$. Thus, the value $x_{i,j}$ will represent the frequency of execution of the $i^{th}$ program module on the $j^{th}$ execution profile.

The behavior of a program is embodied in the manner with which the program control is transferred in the call graph or module flowgraph representation while the program is running. This interaction between any two program instrumentation points $m_a$ and $m_b$ during the execution of a program over L epochs or j execution profiles may be expressed in terms of their covariance, $$cov_{ab} = \frac{1}{j-1} \sum_{i=1}^{j} (x_{a,l} - \bar{x}_a)(x_{b,l} - \bar{x}_b).$$

The principal role of the behavioral analysis of program execution will be in the area of application monitoring. In a computer security context, changes in the correlation of the modules over time from some nominal pattern will indicate the presence of new behavior that is potentially threatening. From an availability perspective, these same changes in program behavior may well mean that the program is now executing in a new and uncertified manner.

A potential problem with using raw execution vectors is that the volume of data generated by a typical program while it is executing is very large. Analysis of these data in real time can generate prohibitively large computational loads on the monitoring system. An objective of the methodology presented here is to reduce the dimensionality of the problem from a very large set of n instrumentation point whose activity is highly correlated to a much smaller set of m virtual instrumentation points whose activity is orthogonal or uncorrelated.

To achieve this reduction in the dimensionality of the problem space, the statistical techniques of principal components analysis or principal factor analysis may be employed, although the present invention is not limited to these techniques. The goal of principal components analysis is to construct linear combinations of the original observations in the data matrix that account for a large part of the total variation. Factor analysis, on the other hand, is concerned with the identification of structure within a data matrix. In principal components analysis the structure of the virtual system is discovered. In factor analysis the structure of the virtual system is known a priori and the variance among the factor structure is apportioned to the variables in the data matrix.

For either of these two techniques, the n×j, j>n data matrix $D = X_1, X_2, \ldots, X_j$ will be factored into m virtual orthogonal module components. Associated with each of the new m orthogonal components will be an eigenvalue $\lambda_i$ where $$\sum_{i=1}^{n} \lambda_i = n.$$

The number of components extracted in the new orthogonal structure will be determined by a stopping rule based on the eigenvalues. Examples of two possible stopping rules would be 1) extract all components whose eigenvalues are greater that some preset threshold, say 1.0, or 2) extract those components such that the proportion of variation represented by $$v = \frac{1}{n} \sum_{i=1}^{m} \lambda_i$$

is at least equal to a present value such as 0.9 or better.

A product of the principal component or factor analysis solution to the factoring of the data matrix, D, is the factor pattern or principal components structure, P. These two statistical techniques are similar. The principal components analysis technique seeks to explain the sources of variation in a set of correlated variables. The factor analytic technique seeks to explain the correlations among the variables. The PCA technique will produce a unique solution whereas the factor analytic model is not unique. In the principal components model the principal components are uncorrelated unconditionally whereas in the factor analytic solution the factors are uncorrelated only within the common factor space. The matrix, P, is an n×m structure whose rows, $p_{.j}$, contain values showing the degree of relationship of the variation of the $i^{th}$ program module and the $j^{th}$ factor or principal component. Let $q_j = {}_{1 \leq j \leq m}^{max} p_{ij}$. Let $o_j = index(q_j)$ represent the column number in which the corresponding value $q_j$ occurs. If, for row j, the largest value of $p_{ij}$ occurs in column 5, then $o_j = 5$. This indicates that the program module, $m_j$, is most clearly related to the fifth factor or principal component.

The vector, O, whose elements are the index values, $o_j$, is defined to be the mapping vector for the execution profile vector. This mapping vector will be employed to send the probe event frequencies recorded in the execution profile vector onto their corresponding virtual module equivalents. That is, the frequency count for the instrumentation point k in an execution profile vector will be represented by $f_k$. The mapping vector element $o_k$ will contain the index value for the principal component (factor), say l, that k maps into.

In essence, the principal components or factor analysis techniques will serve to identify m distinct and orthogonal sources of variation in the data vector D representing the original n program instrumentation points. These new m orthogonal domains will represent the actual manner in which the software system is executing. Whereas the raw measurements taken on the non-reduced software system reflect n distinct instrumentation points, these points are actually interacting as m distinct units m<n.

On each of the original raw profiles, the instrumentation point frequency count was represented in the elements, $x_{i,j}$, of the profile vector, $X_i$. After the mapping vector has been established to map each of the execution interactions as reflected by the individual instrumentation points into a new virtual execution domain, the virtual profile vector, $Y_j$, will be employed to contain the frequency counts for any of the interactions among the virtual execution domain sets. Thus, $$y_{k,\bullet} = \sum_{i=1}^{n} f(x_{i,\bullet}) \text{ where,}$$

$$f(x_{i,\bullet}) = \begin{cases} 0 & \text{if } o_i \neq k \\ x_{i,\bullet} & \text{otherwise} \end{cases}.$$

Each of the vectors $X_i$ represents a point in an n dimensional space. Each of the vectors $Y_i$ represents a point in a substantially reduced m dimensional space. Each point in the n dimensional raw vector represents a behavioral observation of the software system during K epochs. The frequency counts of the individual instrumentation points are, however, correlated. Each of the points in a reduced virtual execution domain similarly represents a behavioral observation also during the same K epochs. The frequencies counts of each of these points are, however, not correlated.

Computer System Suitable for Implementing the Present Invention

Figure 4:
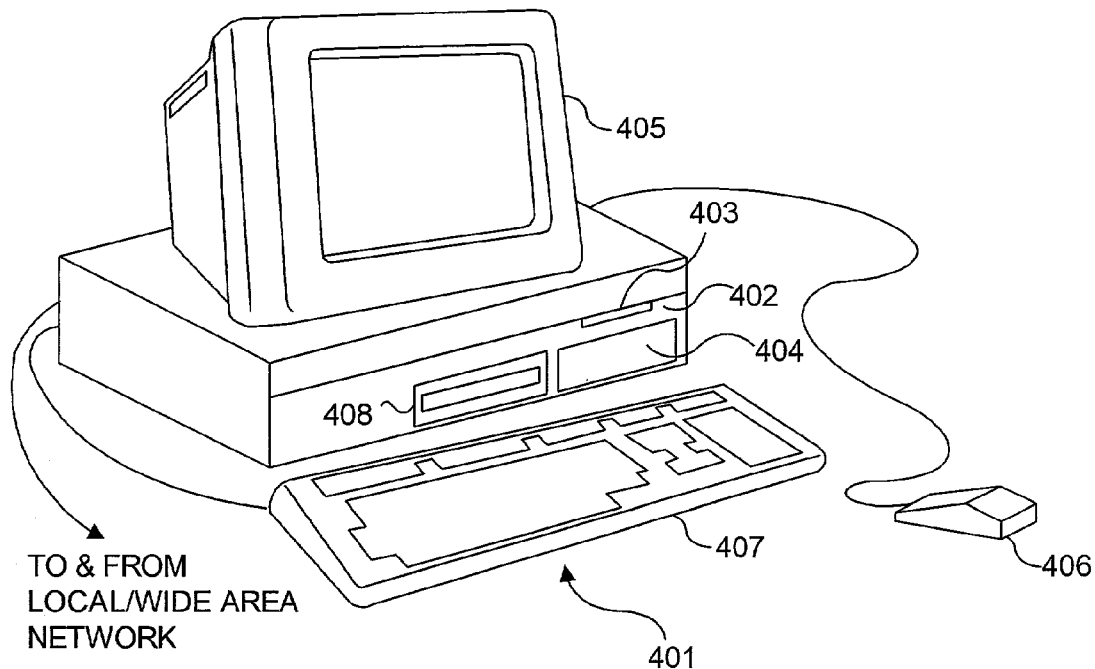
FIG. 4 is an isometric view of a generally conventional computer system suitable for implementing the present invention.

With reference to FIG. 4, a generally conventional computer 401 is illustrated, which is suitable for use in connection with practicing the present invention. Alternatively, a workstation, laptop, distributed systems environment, or other type of computational system may instead be used. Computer 401 includes a processor chassis 402 in which are optionally mounted a floppy or other removable media disk drive 403, a hard drive 404, a motherboard populated with appropriate integrated circuits (not shown), and a power supply (also not shown). A monitor 405 (or other display device) is included for displaying graphics and text generated by software programs, and more specifically, for alarm levels of the present invention. A mouse 406 (or other pointing device) is connected to a serial port (or to a bus port) on the rear of processor chassis 402, and signals from mouse 406 are conveyed to the motherboard to control a cursor on the display and to select text, menu options, and graphic components displayed on monitor 405 in response to software programs executing on the computer, including any program implementing the present invention. In addition, a keyboard 407 is coupled to the motherboard for entry of text and commands that affect the running of software programs executing on the computer.

Computer 401 also optionally includes a compact disk-read only memory (CD-ROM) drive 408 into which a CD-ROM disk may be inserted so that executable files and data on the disk can be read for transfer into the memory and/or into storage on hard drive 404 of computer 401. Other types of data storage devices (not shown), such as a DVD drive or other optical/magnetic media drive, may be included in addition to, or as an alternative to the CD-ROM drive. Computer 401 is preferably coupled to a local area and/or wide area network and is one of a plurality of such computers on the network.

Figure 5:
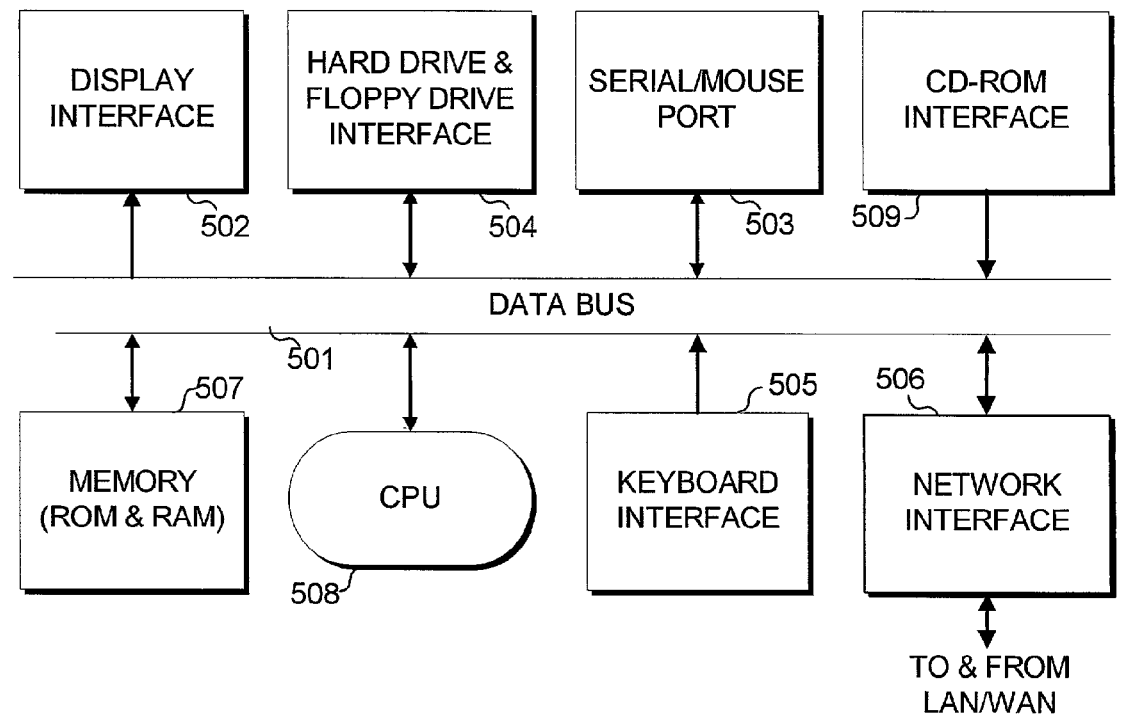
FIG. 5 is block diagram showing internal components of the computer system of FIG. 4.

Although details relating to all of the components mounted on the motherboard or otherwise installed inside processor chassis 402 are not illustrated, FIG. 5 is a block diagram illustrating some of the functional components that are included. The motherboard includes a data bus 501 to which these functional components are electrically connected. A display interface 502, comprising a video card, for example, generates signals in response to instructions executed by a central processing unit (CPU) 508 that are transmitted to monitor 405 so that graphics and text are displayed on the monitor. A hard drive/floppy drive interface 504 is coupled to data bus 501 to enable bi-directional flow of data and instructions between data bus 501 and floppy drive 403 or hard drive 404. Software programs executed by CPU 508 are typically stored on either hard drive 404, or on a CD-ROM, DVD, other optical/magnetic high capacity storage media, or a floppy disk (not shown). Alternatively, the programs may be stored on a server, e.g., if the computer comprises a workstation. A software program including machine language instructions that cause the CPU to implement the present invention will likely be distributed either on conventional magnetic storage media, on-line via, or on a CD-ROM or other optical/magnetic media.

A serial/mouse port 503 (representative of the two serial ports typically provided) is also bi-directionally coupled to data bus 501, enabling signals developed by mouse 940 to be conveyed through the data bus to CPU 508. A CD-ROM interface 509 connects CD-ROM drive 408 (or other storage device) to data bus 501. The CD-ROM interface may be a small computer systems interface (SCSI) type interface or other interface appropriate for connection to and operation of CD-ROM drive 408.

A keyboard interface 505 receives signals from keyboard 407, coupling the signals to data bus 501 for transmission to CPU 508. Optionally coupled to data bus 501 is a network interface 506 (which may comprise, for example, an Ethernet™ card for coupling the computer to a local area and/or wide area network). Thus, data used in connection with the present invention may optionally be stored on a remote server and transferred to computer 401 over the network to implement the present invention.

When a software program is executed by CPU 508, the machine instructions comprising the program that are stored on removable media, such as a CD-ROM, a server (not shown), or on hard drive 404 are transferred into a memory 507 via data bus 501. Machine instructions comprising the software program are executed by CPU 953, causing it to implement functions as described above while running a computer program. Memory 507 includes both a nonvolatile read only memory (ROM) in which machine instructions used for booting up computer 401 are stored, and a random access memory (RAM) in which machine instructions and data are temporarily stored when executing application programs, such as a database program using the present invention.

CONCLUSION

Although the present invention has been described in connection with the preferred form of practicing it and modifications to that preferred form, those of ordinary skill in the art will understand that many other modifications can be made thereto within the scope of the claims that follow. Accordingly, it is not intended that the scope of the invention in any way be limited by the above description, but instead be determined by reference to the claims that follow.

I claim:

1. A computer-implemented method for detecting an anomalous operation of a computer system, comprising:
    (a) monitoring transitions between and among program instrumentation points within an internal operating environment on the computer system and producing program execution trace data;
    (b) comparing the program execution trace data with data indicative of a nominal operation of the computer system; and
    (c) identifying an anomalous operation of the computer system based on the result of the comparison.

2. The computer-implemented method as recited in claim 1, wherein said monitoring is performed by employing software signals obtained from instrumented code at instrumentation points in an execution path of the computer system.

3. The computer-implemented method as recited in claim 1, wherein said monitoring is performed by employing software signals obtained from a hardware address bus associated with the computer system.

4. The computer-implemented method as recited in claim 1, wherein said program execution trace data is employed to provide an execution profile including a list of execution paths that have executed in a specified time frame and the frequencies of executions.

5. The computer-implemented method as recited in claim 1, wherein the computer system comprises a plurality of program modules in an instrumented software system.

6. The computer-implemented method as recited in claim 5, wherein each program module implements a predefined functional requirement.

7. The computer-implemented method as recited in claim 6, wherein each program module includes a mechanism for calling another module, and the method further comprises the use of a statistical methodology to identify a relatively small set of cohesive program modules that represent the dynamic bindings among program modules as they execute.

8. The computer-implemented method as recited in claim 7, wherein instrumentation points are employed to monitor the activity of an executing program and to indicate an epoch in the execution of the program.

9. The computer-implemented method as recited in claim 8, further comprising recording, in an execution profile for the program, telemetry from the instrumentation points at each epoch.

10. The computer-implemented method as recited in claim 9, wherein the execution profile comprises an n element vector (X) comprising at least one entry for each program module.

11. The computer-implemented method as recited in claim 10, wherein each element, $x_i$, of said vector contains a frequency count for the number of times that the corresponding instrumentation point $m_i$ has executed during an era of k epochs, where $$k = \sum_{i=1}^{n} x_i.$$

12. The computer-implemented method as recited in claim 11, wherein an execution profile is recorded whenever the number of epochs, k, reaches a predefined count, K, at which time the contents of the execution profile vector is set to zero.

13. The computer-implemented method as recited in claim 12, wherein the recorded activity of the program during its last L=jK epochs is stored in a sequence of j execution profiles, $X_1, X_2, \ldots, X_j$, where the value $x_{i,j}$ represents the frequency of execution of the $i^{th}$ program module on the $j^{th}$ th execution profile.

14. The computer-implemented method as recited in claim 11, further comprising the step of reducing the dimensionality of the execution profiles from n, the number of instrumentation points whose activity is highly correlated, to a smaller set of m virtual instrumentation points whose activity is relatively uncorrelated.

15. The computer-implemented method as recited in claim 14, wherein the statistical technique of principal components analysis is employed to reduce the dimensionality of the execution profiles.

16. The computer-implemented method as recited in claim 14, wherein the statistical technique of principal factor analysis is employed to reduce the dimensionality of the execution profiles.

17. The computer-implemented method as recited in claim 14, wherein an n×j,j>n data matrix $D=X_1, X_2, \ldots, X_j$ is factored into m virtual orthogonal module components, where m is less than n, whereby the dimensionality is reduced from n to m.

18. The computer-implemented method as recited in claim 17, wherein an eigenvalue $\lambda_i$, is associated with each of the m orthogonal components.

19. The computer-implemented method as recited in claim 18, wherein the eigenvalues satisfy the relation $$\sum_{i=1}^{n} \lambda_i = n.$$

20. The computer-implemented method as recited in claim 17, further comprising using a predefined stopping rule in determining a number of components extracted in an orthogonal structure representing an execution profile with reduced dimensionality.

21. The computer-implemented method as recited in claim 20, wherein the stopping rule is: extract all components whose eigenvalues are greater that a predefined threshold.

22. The computer-implemented method as recited in claim 20, wherein the stopping rule is: extract those components such that the proportion of variation represented by $$v = \frac{1}{n} \sum_{i=1}^{m} \lambda_i$$

is at least equal to a predefined value.

23. The computer-implemented method as recited in claim 17, further comprising constructing a matrix (P), wherein said matrix is an n×m structure whose rows, $p_{\cdot j}$, contain values showing the degree of relationship of the variation of the $i^{th}$ program module and the $j^{th}$ factor or principal component.

24. The computer-implemented method as recited in claim 17, further comprising the step of forming a mapping vector (O) for at least one execution profile vector.

25. The computer-implemented method as recited in claim 24, wherein the mapping vector,O, comprises elements $o_j$ values are defined as follows:
let $$q_i = \max_{1 \le j \le m} p_{ij};$$

let $o_j$=index($q_j$) represent the column number in which the corresponding value $q_j$ occurs.

26. The computer-implemented method as recited in claim 25, wherein the mapping vector contains data to map probe event frequencies recorded in the execution profile vector onto corresponding virtual module equivalents.

27. The computer-implemented method as recited in claim 26, wherein a frequency count for each instrumentation point k in an execution profile vector is represented by a value $f_k$ and the mapping vector element $o_k$ k contains an the index value that k maps into.

28. The computer-implemented method as recited in claim 17, wherein m orthogonal sources of variation in the data vector D representing the original n program instrumentation points are identified.

29. The computer-implemented method as recited in claim 27, wherein, on each of the original raw execution profiles, the instrumentation point frequency count is represented in the elements, $x_{i,j}$, ofthe profile vector, $X_i$.

30. The computer-implemented method as recited in claim 24, wherein a frequency count for each instrumentation point k in an execution profile vector is represented by a value $f_k$; wherein the mapping vector element $o_k$ contains an the index value that k maps into; wherein the mapping vector contains data to map probe event frequencies recorded in the execution profile vector onto corresponding virtual module equivalents; and wherein, after the mapping vector has been established, a virtual profile vector ($Y_i$) is employed to contain the frequency counts for interactions among virtual execution domain sets.

31. The computer-implemented method as recited in claim 30, wherein the virtual profile vector, $Y_i$, is defined by:

$$y_{k,\bullet} = \sum_{i=1}^{n} f(x_{i,\bullet}) \text{ where,}$$

$$f(x_{i,\bullet}) = \begin{cases} 0 & \text{if } o_i \neq k \\ x_{i,\bullet} & \text{otherwise} \end{cases}.$$

32. A computer-implemented method for detecting an anomalous operation of a computer system including a plurality of program modules, comprising:
   (a) monitoring transitions between and among instrumentation points within an internal operating environment on the computer system, wherein said monitoring is performed by employing software signals obtained from instrumented code in the program modules;
   (b) providing program instrumentation trace data representative of the transitions between and among program modules within a time frame;
   (c) identifying a relatively small set of virtual execution domains whose activity is substantially uncorrelated, and using this information to reduce the amount of trace data needed to detect anomalous activity;
   (d) comparing the reduced amount of trace data with predefined data indicative of a nominal operation of the computer system; and
   (e) identifying an anomalous operation of the computer system based on the result of the comparison.

33. The computer-implemented method as recited in claim 32, wherein said program execution trace data is employed to provide an execution profile including a list of execution paths that have executed in a specified time frame and the frequencies of executions.

34. The computer-implemented method as recited in claim 32, wherein each program module includes a mechanism for calling another module, and wherein step (c) comprises the use of a statistical methodology to identify a relatively small set of cohesive program modules that represent dynamic bindings among program modules as they execute.

35. The computer-implemented method as recited in claim 32, wherein instrumentation points are employed to monitor the activity of an executing program and to indicate an epoch in the execution of the program.

36. The computer-implemented method as recited in claim 35, further comprising recording, in a first execution profile for the program, telemetry from the instrumentation points at each epoch.

37. The computer-implemented method as recited in claim 36, wherein the first execution profile comprises an n element vector (X) comprising at least one entry for each program module, and wherein each element, $x_i$, of said vector contains a frequency count for the number of times that the corresponding instrumentation point $m_i$ has executed during an era of k epochs, where $$k = \sum_{i=1}^{n} x_i;$$

and wherein an execution profile is recorded whenever the number of epochs, k, reaches a predefined count, K, at which time the contents of the execution profile vector is set to zero.

38. The computer-implemented method as recited in claim 37, wherein the recorded activity of the program during its last L=jK epochs is stored in a sequence of j execution profiles, $X_1, X_2, \ldots, X_j$, where the value $x_{i,j}$ represents the frequency of execution of the $i^{th}$ program module on the $j^{th}$ execution profile.

39. The computer-implemented method as recited in claim 38, further comprising the step of reducing the dimensionality of the execution profiles from n, the number of instrumentation points whose activity is highly correlated, to a smaller set of m virtual instrumentation points whose activity is relatively uncorrelated.

40. The computer-implemented method as recited in claim 39, wherein the statistical technique of principal components analysis is employed to reduce the dimensionality of the execution profiles.

41. The computer-implemented method as recited in claim 39, wherein the statistical technique of principal factor analysis is employed to reduce the dimensionality of the execution profiles.

42. The computer-implemented method as recited in claim 39, wherein an n×j,j>n data matrix $D = X_1, X_2, \ldots, X_j$ is factored into m virtual orthogonal module components, where m is less than n, whereby the dimensionality is reduced from n to m.

43. The computer-implemented method as recited in claim 42, wherein an eigenvalue $\lambda_i$ is associated with each of the m orthogonal components.

44. The computer-implemented method as recited in claim 43, wherein the eigenvalues satisfy the relation $$\sum_{i=1}^{n} \lambda_i = n.$$

45. The computer-implemented method as recited in claim 39, further comprising using a predefined stopping rule in determining a number of components extracted in an orthogonal structure representing an execution profile with reduced dimensionality.

46. The computer-implemented method as recited in claim 45, wherein the stopping rule is: extract all components whose eigenvalues are greater that a predefined threshold.

47. The computer-implemented method as recited in claim 45, wherein the stopping rule is: extract those components such that the proportion of variation represented by $$v = \frac{1}{n} \sum_{i=1}^{m} \lambda_i$$

is at least equal to a predefined value.

48. The computer-implemented method as recited in claim 45, further comprising constructing a matrix (P), wherein said matrix is an n×m structure whose rows, $p_{19\ j}$, contain values showing the degree of relationship of the variation of the $j^{th}$ program module and the $j^{th}$ factor or principal component.

49. The computer-implemented method as recited in claim 48, further comprising the step of forming a mapping vector (O) for at least one execution profile vector, wherein the mapping vector,O, comprises elements $o_j$ whose values are defined as follows:
let $$q_i = \max_{1 \leq j \leq m} p_{ij};$$

let $o_j$=index($q_j$) represent the column number in which the corresponding value $q_j$ occurs.

50. The computer-implemented method as recited in claim 49, wherein the mapping vector contains data to map probe event frequencies recorded in the execution profile vector onto corresponding virtual module equivalents.

51. The computer-implemented method as recited in claim 50, wherein a frequency count for each instrumentation point k in an execution profile vector is represented by a value $f_k$, and the mapping vector element $o_k$ contains an the index value that k maps into.

52. The computer-implemented method as recited in claim 51, wherein m orthogonal sources of variation in the data vector D representing the original n program instrumentation points are identified.

53. The computer-implemented method as recited in claim 52, wherein, on each of the original raw execution profiles, the instrumentation point frequency count is represented in the elements, $x_{i,j}$, of the profile vector, $X_i$.

54. The computer-implemented method as recited in claim 53, wherein the mapping vector contains data to map probe event frequencies recorded in the execution profile vector onto corresponding virtual module equivalents; and wherein, after the mapping vector has been established, a virtual profile vector $(Y_i)$ is employed to contain the frequency counts for interactions among virtual execution domain sets.

55. The computer-implemented method as recited in claim 54, wherein the virtual profile vector, $Y_i$, is defined by:

$$y_{k,\bullet} = \sum_{i=1}^{n} f(x_{i,\bullet}) \text{ where,}$$

$$f(x_{i,\bullet}) = \begin{cases} 0 & \text{if } o_i \neq k \\ x_{i,\bullet} & \text{otherwise} \end{cases}.$$

56. A computer system, comprising:
(a) a plurality of program modules;
(b) monitoring means for monitoring transitions between and among instrumentation points within the program modules, wherein said monitoring is performed by employing software signals obtained from instrumented code in the program modules, and for providing program instrumentation trace data representative of the transitions between and among program modules within a time frame;
(c) means for identifying a relatively small set of virtual execution domains whose activity is substantially uncorrelated, and using this information to reduce the amount of trace data needed to detect anomalous activity;
(d) means for comparing the reduced amount of trace data with predefined data indicative of a nominal operation of the computer system; and
(e) means for identifying an anomalous operation of the computer system based on the result of the comparison.

57. A system as recited in claim 56, wherein said program execution trace data is employed to provide an execution profile including a list of execution paths that have executed in a specified time frame and the frequencies of executions.

58. A system as recited in claim 56, wherein each program module includes a mechanism for calling another module, and wherein step (c) comprises the use of a statistical method to identify a relatively small set of cohesive program modules that represent dynamic bindings among program modules as they execute.

59. A system as recited in claim 56, wherein instrumentation points are employed to monitor the activity of an executing program and to indicate an epoch in the execution of the program.

60. A system as recited in claim 59, further comprising recording, in a first execution profile for the program, telemetry from the instrumentation points at each epoch.

61. A system as recited in claim 60, wherein the first execution profile comprises an n element vector (X) comprising at least one entry for each program module, and wherein each element, $x_i$, of said vector contains a frequency count for the number of times that the corresponding instrumentation point $m_i$ has executed during an era of k epochs, where $$k = \sum_{i=1}^{n} x_i;$$

and wherein an execution profile is recorded whenever the number of epochs, k, reaches a predefined count, K, at which time the contents of the execution profile vector is set to zero.

62. A system as recited in claim 61, wherein the recorded activity of the program during its last L=jK epochs is stored in a sequence of j execution profiles, $X_1, X_2, \ldots, X_j$, where the value $x_{i,j}$ represents the frequency of execution of the $i^{th}$ program module on the $j^{th}$ execution profile.

63. A system as recited in claim 62, further comprising the step of reducing the dimensionality of the execution profiles from n, the number of instrumentation points whose activity is highly correlated, to a smaller set of m virtual instrumentation points whose activity is relatively uncorrelated.

64. A system as recited in claim 63, wherein the statistical technique of principal components analysis is employed to reduce the dimensionality of the execution profiles.

65. A system as recited in claim 63, wherein the statistical technique of principal factor analysis is employed to reduce the dimensionality of the execution profiles.

66. A system as recited in claim 63, wherein an n×j,j>n data matrix $D = X_1, X_2, \ldots, X_j$ is factored into m virtual orthogonal module components, where m is less than n, whereby the dimensionality is reduced from n to m.

67. A system as recited in claim 66, wherein an eigenvalue $\lambda_i$ is associated with each of the m orthogonal components.

68. A system as recited in claim 67, wherein the eigenvalues satisfy the relation $$\sum_{i=1}^{n} \lambda_i = n.$$

69. A system as recited in claim 68, further comprising using a predefined stopping rule in determining a number of components extracted in an orthogonal structure representing an execution profile with reduced dimensionality.

70. A system as recited in claim 69, wherein the stopping rule is: extract all components whose eigenvalues are greater that a predefined threshold.

71. A system as recited in claim 69, wherein the stopping rule is: extract those components such that the proportion of variation represented by $$v = \frac{1}{n}\sum_{i=1}^{m} \lambda_i$$

is at least equal to a predefined value.

72. A system as recited in claim 68, further comprising constructing a matrix (P), wherein said matrix is an n×m structure whose rows, $p_{.j}$, contain values showing the degree of relationship of the variation of the $i^{th}$ program module and the $j^{th}$ factor or principal component.

73. A system as recited in claim 72, further comprising the step of forming a mapping vector (O) for at least one execution profile vector, wherein the mapping vector, O, comprises elements $o_j$ whose values are defined as follows:

let $$q_i = \max_{1 \le j \le m} p_{ij};$$

let $o_j$=index($q_j$) represent the column number in which the corresponding value $q_j$ occurs.

74. A system as recited in claim 73, wherein the mapping vector contains data to map probe event frequencies recorded in the execution profile vector onto corresponding virtual module equivalents.

75. A system as recited in claim 74, wherein a frequency count for each instrumentation point k in an execution profile vector is represented by a value $f_k$, and the mapping vector element $o_k$ contains an the index value that k maps into.

76. A system as recited in claim 75, wherein m orthogonal sources of variation in the data vector D representing the original n program instrumentation points are identified.

77. A system as recited in claim 76, wherein, on each of the original raw execution profiles, the instrumentation point frequency count is represented in the elements, $x_{i,j}$, of the profile vector, $X_i$.

78. A system as recited in claim 77, wherein the mapping vector contains data to map probe event frequencies recorded in the execution profile vector onto corresponding virtual module equivalents; and wherein, after the mapping vector has been established, a virtual profile vector ($Y_i$) is employed to contain the frequency counts for interactions among virtual execution domain sets.

79. A system as recited in claim 78, wherein the virtual profile vector, $Y_i$, is defined by:

$$y_{k,\bullet} = \sum_{i=1}^{n} f(x_{i,\bullet}) \text{ where,}$$

$$f(x_{i,\bullet}) = \begin{cases} 0 & \text{if } o_i \ne k \\ x_{i,\bullet} & \text{otherwise} \end{cases}.$$

* * * * *